(12) United States Patent
Skinner

(10) Patent No.: US 9,041,665 B2
(45) Date of Patent: May 26, 2015

(54) DEVICES AND PROCESSES FOR DATA INPUT

(75) Inventor: Peter James Skinner, Montclair, NJ (US)

(73) Assignee: Ten One Design, LLC, Montclair, NJ (US)

( * ) Notice: Subject to any disclaimer, the term of this patent is extended or adjusted under 35 U.S.C. 154(b) by 290 days.

(21) Appl. No.: 13/337,901

(22) Filed: Dec. 27, 2011

(65) Prior Publication Data

US 2013/0002571 A1    Jan. 3, 2013

Related U.S. Application Data

(60) Provisional application No. 61/429,247, filed on Jan. 3, 2011.

(51) Int. Cl.
*G06F 3/0338* (2013.01)
*G06F 3/0354* (2013.01)

(52) U.S. Cl.
CPC .......... *G06F 3/0338* (2013.01); *G06F 3/03547* (2013.01)

(58) Field of Classification Search
CPC . G06F 3/0338; G06F 3/0354; G06F 3/03541; G06F 3/03547; G06F 3/03548; G06F 3/041
See application file for complete search history.

(56) References Cited

U.S. PATENT DOCUMENTS

| | | | |
|---|---|---|---|
| 6,061,004 A * | 5/2000 | Rosenberg | 341/20 |
| 6,606,081 B1 * | 8/2003 | Jaeger et al. | 345/111 |
| 7,391,410 B2 | 6/2008 | Lutnaes | |
| 7,548,232 B2 * | 6/2009 | Shahoian et al. | 345/173 |
| 8,199,114 B1 * | 6/2012 | Jaeger et al. | 345/173 |
| 8,368,662 B2 * | 2/2013 | Argiro | 345/173 |
| 8,441,450 B2 * | 5/2013 | Degner et al. | 345/173 |
| 2006/0022956 A1 | 2/2006 | Lengeling | |
| 2006/0256090 A1 | 11/2006 | Huppi | |
| 2010/0079403 A1 | 4/2010 | Lynch et al. | |
| 2010/0079404 A1 | 4/2010 | Degner et al. | |
| 2010/0090974 A1 | 4/2010 | Jung | |
| 2010/0207899 A1 | 8/2010 | Oh | |

OTHER PUBLICATIONS

International Search Report for PCT/US11/67477.

* cited by examiner

*Primary Examiner* — Jonathan Boyd
*Assistant Examiner* — Sardis Azongha
(74) *Attorney, Agent, or Firm* — Ware, Fressola, Maguire & Barber LLP

(57) ABSTRACT

Devices are disclosed for inputting data to a touch sensitive user interface, which devices comprise a base operative to affix to the user interface, a button having an outer touch surface and an inner surface operative to engage the user interface to convey a data input signal thereto in response to presence of a user's finger at the outer touch surface of the button, and an arm connecting the button to the base; processes for data input are also disclosed.

38 Claims, 7 Drawing Sheets

DEVICES AND PROCESSES FOR DATA INPUT

PRIORITY INFORMATION

The priority of U.S. Provisional Application No. 61/429,247, filed Jan. 3, 2011, is claimed, the subject matter of such provisional application being incorporated herein by reference.

FIELD OF THE INVENTION

The present invention concerns the input of data to a touch-sensitive user interface, such as the touch screen for a computer, mobile telephone, or hand-held data processing device.

BACKGROUND OF THE INVENTION

Portable electronic devices typically comprise a touchpad or touch screen display, or other interface system capable of detecting the location of contact with the interface. Touching or otherwise contacting the touchpad, touch screen or other interface at a particular location causes the electronic device to perform a particular function. The touch pad, touch screen or other interface of such a device typically has one or more touch-sensitive locations.

However, it can be a shortcoming of the touch-sensitive location that it does not exhibit a tactile feeling which provides a user with feedback to confirm whether a selection has been made or not. As a result, the user may lose the position of the touch-sensitive location, or may not recognize the feeling provided when the location is pushed. Additionally, a touch-sensitive location of interest that does not exhibit tactile feeling may be difficult to locate when a user is concentrating on another portion of the screen, for example, the content of a game instead of the controls for the game.

A further drawback of such technology insofar as there are multiple touch locations is that more than one of those locations may be touched or otherwise contacted simultaneously during operation of the device, resulting in activation of an unwanted function ("multiple simultaneous touches"). Furthermore, even in the case of proper operation, certain applications of the technology require that, prior to pushing, a user carefully position his finger over the touch-sensitive location substantially in register with the sensitized area, leaving an air gap so as not to activate a sensitive location accidentally. When a plurality of locations is to be touched or otherwise contacted in sequence, the user is forced to position his finger over each successive location in the sequence, while leaving an airgap to prevent unintended activation. This is inconvenient and slows operation of the device, but is not practically speaking avoidable if a user's execution of discrete touches or contacts at desired different locations is to be achieved.

As a remedy, it has been suggested to mount "buttons" on a touch screen or other interface, overlying at least in part desired locations that are touch-sensitive. For instance, according to U.S. Publication No. US2010/0079403 (the "403 Publication"), a physical element is removably affixed to a touch screen or other interface, whereby to provide one or more tactile structures, such as properly sized button attachment structures. These structures are "mounted on or otherwise held against" the screen or other interface "by suction or static forces", or "using an adhesive material such as a fugitive adhesive". The button attachment structures are said "[i]n general . . . to be formed from a flexible material . . . typically stiff enough to allow button attachment structures . . . to maintain their shapes, and flexible enough to allow button attachment structures to be pressed to engage touch areas". It is further taught that the button attachment structures "may be formed from a substantially transparent material . . . or a material which is colored or printed to effectively look like touch areas". In the 403 Publication an embodiment for preventing accidental activation of a touch-sensitive location is discussed, wherein a button attachment structure with "a top surface, or a button actuation area, . . . is positioned at a distance above a touch-screen", such that an airgap is maintained, with the result that a touch-sensitive location will not be activated except if a substantial force is applied.

However, the foregoing technology is disadvantageously limited. Focusing initially on a single "button attachment structure" and touch-sensitive location in isolation, the structure is affixed to the touch screen or other interface so that structure does not move. While some embodiments mentioned in the 403 Publication comprise a button actuator structure having an airgap between an actuation area and a touch-screen's touch-sensitive location, with the result that a substantial force must be applied to the actuator area to cause contact with the touch-sensitive location, there is no assurance that this will be accompanied by a "feel" which indicates to the user that contact is effected. Moreover, a fixed structure is effectively anchored at one site, and cannot be moved to any other location on the surface, during "real time" operation of the data processing device. And, in any event, a fixed structure cannot be operated by a user for the purpose of data input to indicate direction or magnitude of motion of an object or avatar, such as while playing a game.

Furthermore, when the foregoing consideration is expanded to multiple touch-sensitive locations on the same interface, additional shortcomings are evident. So-called "button attachment structures" may be affixed at respective particular locations, in effect one structure per individual touch-sensitive location. Alternatively, a single button attachment structure may include multiple button activator areas, which areas are respectively in register (at least partially) with separate ones of the touch-sensitive locations on a touchpad, touch screen or other interface. When there is a plurality of touch-sensitive locations, each overlain by its own button attachment structure or button actuator area, those structures or areas will typically be crowded together in the same manner as the touch-sensitive locations. The button attachment structures, though mitigating the need to maintain the aforementioned airgap between finger and touch-sensitive location, are no more accommodating to discrete access by a user than are the sensitive locations themselves. In addition, as previously mentioned, while removably affixed the button attachment structure or actuator areas thereof are not susceptible of real-time rearrangement from contact with one sensitive location to contact with another. Because the structure or its actuator areas are incapable of shifting among different sensitive locations, multiple structures, or multiple actuator areas, each one assigned to a different sensitive location must be small enough to be positioned "cheek by jowl" with the others. This also tends to interfere with their configuration in such manner as to facilitate the desired discrete access, and concomitant ready initiation of intended functions with precision.

The 403 publication also discloses a joystick configuration whereby a joystick actuator is attached to a screen directly under the joystick's pivot point, and contact points connected to the joystick apply a force to the button attachment structure when the joystick is pivoted (see, for example, FIG. 9). This configuration has several drawbacks. First, since the joystick actuator is arranged such that the portion directly beneath the pivot point is occupied by an attachment portion, this configuration does not allow for input to be generated, or buttons to be actuated, in or from the center position of the joystick. Second, such a configuration could only be operative with discrete input regions, and not input regions simulating joysticks. For example, a game program with an input region simulating a joystick would require contact be made at the center location and the input device moved outwardly to indicate direction and/or magnitude—which would be incompatible with the joystick configuration of the 403 publication. Third, since the joystick relies on attachment portions that actuate fixed position button attachments, the disclosed configuration cannot indicate the magnitude of motion of an object or avatar, such as while playing a game.

Along such lines, in U.S. Publication No. U.S. 2006/0256090 (the "090 Publication") it is observed that there are many styles of "input devices for performing operations in an electronic system". An example given is "touch controls such as touch pads and touch screens that allow a user to make selections and move a cursor by simply touching the touch surface via a finger or stylus". But, it is explained that even if "a simple decal is provided over the touch pad to indicate the location of dedicated touch controls", the user must still examine the interface surface during use to identify the location, which slows productivity. It is further noted that advanced touch sensing devices do not provide an indication of when there has been a successful touch input. Thus, the referenced system is characterized as providing "no indication of whether something has been selected".

Therefore, the 090 Publication offers a modified approach. It is prescribed that "to generate the various mechanical control inputs, . . . [a] mechanical overlay includes one or more mechanical actuators that move relative to base [which] is configured for removable placement over the touch-sensitive surface of the touch sensing input device". Accordingly, when the base is placed over the touch-sensitive surface and when the mechanical actuators are moved, the touch-sensitive surface senses the motion of the mechanical actuators and produces signals indicative thereof (the mechanical actuators provide the touch inputs rather than a finger or stylus). For its part, the "base of the mechanical overlay can be attached or held against the touch sensing input device in a variety of different ways including by clips, pins, tabs, snaps, latches, screws, adhesive, Velcro material, magnets, static attraction, vacuum (e.g. suction cups)".

Although both of the 403 and 090 Publications purport to disclose improved technologies whereby a mechanical or other element is operated by a user to exert force upon a touch-sensitive location of a touch pad, touch screen or other interface, both of them fall short. More specifically, neither one enables input of data indicating direction and magnitude of motion, or addresses the problem of how to mitigate unwanted imprecision in contacting a desired touch-sensitive location while avoiding contact with other touch-sensitive locations around it.

Other approaches have also been suggested:

Thus, in U.S. Publication No. U.S. 2006/0022956 there is disclosed an electronic apparatus which includes a touch screen, optionally multipoint, that provides user input and display capabilities. The touch screen is said to be operative by making contact with a touch input area on the screen, i.e., a virtual data input element. This has drawbacks from the standpoint of incapacity to provide a lack of "feel" to the user concerning whether contact has resulted in data input.

In U.S. Pat. No. 7,391,410 (the "410 patent") there is disclosed a movement input device comprising a touch-screen contact part which protrudes from the bottom side of a unit for fastening the movement input device to a portable electronic device that includes a touchscreen. It is further disclosed that there is a user actuation part, protruding from the top side of the fastening unit and aligned with the touch screen contact part, which user actuation part is actuable for free angular movement around an axis whereby to input data about (at least) an angle of the user interaction part. Nevertheless, there is an absence of teaching as to a data entry element which is movable over the face of the touch screen in other than angular fashion. Additionally, the input device disclosed by the 410 patent provides an input signal to the touch screen directly opposite to the angle provided by the user's input—i.e., a user moving the joystick at an angle of 45 degrees, will result in an input signal of 225 degrees (or −135 degrees) to the touch screen. With this configuration, a user would be required to move the joystick in the direction opposite of the input desired—a counterintuitive operation—or additional software would be needed to process the input correctly.

In U.S. Publication No. U.S. 2010/0207899 there is disclosed a character input device in which are incorporated an input tool and a detection unit, the input tool comprising a plate-shaped unit superimposed over a surface of the detection unit and such unit including a projection element for contact with the detection unit. The input tool is said to be for enabling directional input, but has an intricate construction and (from all that appears) a limited range of motion. Additionally, the input tool may disrupt clear views of the detection unit surface thereunder. Furthermore, this input device does not appear to return automatically to a center position of the interface region's range of motion. For example, when a user moves the input device from the center position and then releases the input device, it will not automatically return to the center position. This would render the input device poorly suited to input operations that rely on a center position for calibrating an input's direction and magnitude, such as an input region simulating a joystick.

In U.S. Publication No. U.S. 2010/0090974 (the "974 publication") there is disclosed a technology for providing input to a portable terminal. Pursuant to the technology, a switch comprising a suction plate is attached to the terminal's touchscreen, and a button capable of touching the screen when pushed inserted in such suction plate. In some embodiments, the switch takes the form of a stick said to be useful as a navigation key for inputting direction. However, for reasons explained already in connection with the 090 Publication, the reported development falls short inasmuch as there is no provision for "real time" movement of the switch from one location to another on the touchscreen. Moreover, although the 974 publication discloses an embodiment capable of directional indication (see, for example, FIG. 2B), it suffers from the same shortcomings as the 410 patent. Specifically, the device provides an input signal to the touch screen directly opposite to the angle provided by the user's input—i.e., a user moving the joystick at an angle of 45 degrees, will result in an input signal of 225 degrees (or −135 degrees) to the touch screen. With this configuration, a user would be required to move the joystick counterintuitively in the direction opposite of the input desired, or additional software would be needed to correctly process the input.

A technology which ameliorates the shortcomings discussed in the preceding passages would be a significant advance.

SUMMARY OF THE INVENTION

It is an object of the invention to provide a versatile and accurate data input function for interacting with a touch-sensitive user interface.

It is another object of the invention to provide a data input device and method in which an implement for interacting with a touch-sensitive user interface is capable of movement such that, during the input operation, it can be brought into contact sequentially with more than one location on the interface.

It is yet another object of the invention to provide a data input device and method in which the data input interaction with a touch-sensitive user interface can be precisely confined to a desired touch-sensitive location, or to each one in a sequence of varying touch-sensitive locations, thereby mitigating the likelihood of simultaneous contact with more than one touch-sensitive location, and the concomitant activation of one or more unwanted functions.

It is still another object of the invention to provide a data input device and method in which an implement for interacting with a touch-sensitive user interface is biased against separation from the user interface.

Accordingly, in a first aspect the invention is a device for inputting data to a touch-sensitive user interface which comprises: a base operative to affix to the user interface; a button having an outer touch surface and an inner surface operative to engage the user interface to convey a data input signal thereto in response to presence of a user's finger at the outer touch surface of the button; and an arm having a first end affixed to the base and a second end affixed to the button, the arm comprising first and second arm segments arranged between the first and second ends; each of the first and second arm segments being movable in respectively different directions over the user interface in response to force applied by the user's finger to the button to enable the button to move over the user interface.

In another aspect, the invention is a device for inputting data to a touch-sensitive user interface, which comprises: a base operative to affix to the user interface; a button having an outer touch surface and an inner surface operative to engage the user interface to convey a data input signal thereto in response to presence of a user's finger at the outer touch surface of the button; a member affixed to the base; and a rotatable connector connecting the member to the button; such that the member permits the button to be moved in multiple directions laterally over the user interface in response to force applied by the user's finger, while the rotatable connector permits the member to rotate with respect to the button as it is thus moved.

In yet another aspect, the invention is a device for inputting data to a touch-sensitive user interface, which comprises: a base operative to affix to the user interface; a button having an outer touch surface and an inner surface operative to engage the user interface to convey a data input signal thereto in response to presence of a user's finger at the outer touch surface of the button; and a member affixed to the base and to the button; the member biasing the inner surface of the button against separation from the user interface and permitting the button to move in multiple directions laterally over the user interface in response to force applied by the user's finger.

In still another aspect, the invention is a process for inputting data to a touch-sensitive user interface, which comprises: affixing a base to the user interface, the base being affixed to a member, the member being affixed to a button; the button having an outer touch surface and an inner surface; engaging the user interface with the inner surface of the button; conveying a data input signal to the user interface via the button in response to presence of a user's finger at the outer touch surface thereof; and biasing the inner surface of the button against the user interface by means of the member.

In a further aspect, the invention is a process for inputting data to a touch-sensitive user interface, which comprises: affixing a base to the user interface, the base being affixed to an arm at one end thereof, the arm being affixed to a button at a second end thereof and having first and second arm segments arranged between the first and second ends; the button having an outer touch surface and an inner surface; engaging the user interface with the inner surface of the button; conveying a data input signal to the user interface via the button in response to presence of a user's finger at the outer touch surface thereof; and moving the button over the user interface in response to force applied by the user thereto such that the first and second arm segments move in respectively different directions laterally over the user interface to permit the button to move with respect to the base.

And, in a still further aspect, the invention is a process for inputting data to a touch-sensitive user interface, which comprises: affixing a base to the user interface, the base being affixed to a member, the member being affixed to a button; the button having an outer touch surface and an inner surface; engaging the user interface with the inner surface of the button; conveying a data input signal to the user interface via the button in response to presence of a user's finger at the outer touch surface thereof; and moving the button over the user interface in response to force applied by the user thereto while rotating the button with respect to the member.

Substantial advantages accrue to the practitioner of the invention. Thus, data input is achieved in an effective and precise manner, without resort to unduly complicated technological measures. The invention is convenient to deploy, and is suitable for use across the spectrum of data processing devices comprising a touch-sensitive user interface for receiving data input. Data input is effective because the provision of a physical element (for instance, a button) as the component touched or otherwise contacted—rather than the touch-location itself, which is a virtual element—enables the user to determine dispositively the position of the touch-location and that it has been touched or contacted. The invention is precise because the data input implement's button can be moved reliably to the desired location on a touch screen, and further because the data input has a reduced-obstruction profile that allows for good user-interface visibility. Moreover, in the case of multiple touch locations, precision is conferred due to enablement of data input via the desired location without a propensity for simultaneous contact with one or more unintended locations.

Other aspects and advantages of the invention will be apparent from the following disclosure including the figures of drawing referred to therein.

FIGURES OF DRAWING

Figure 3:
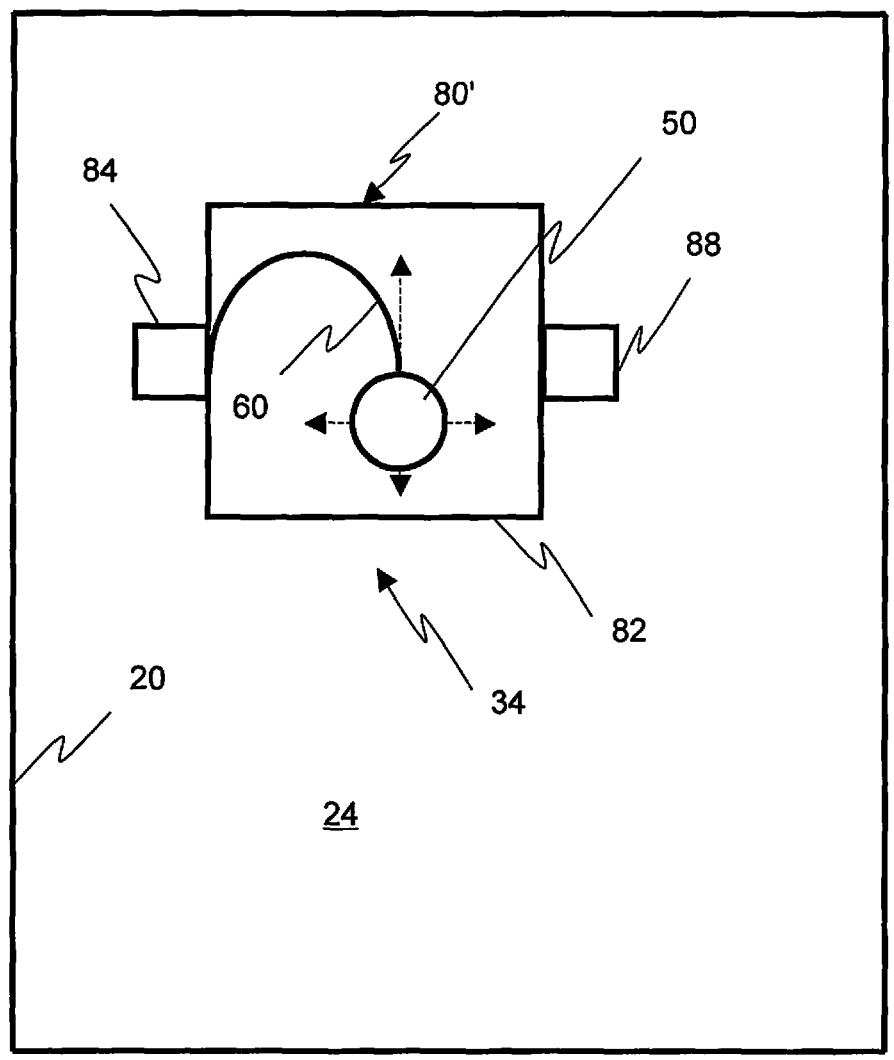

FIG. 3 schematically illustrates further embodiments of a data input device affixed to a touch-sensitive user interface.

Figure 4:
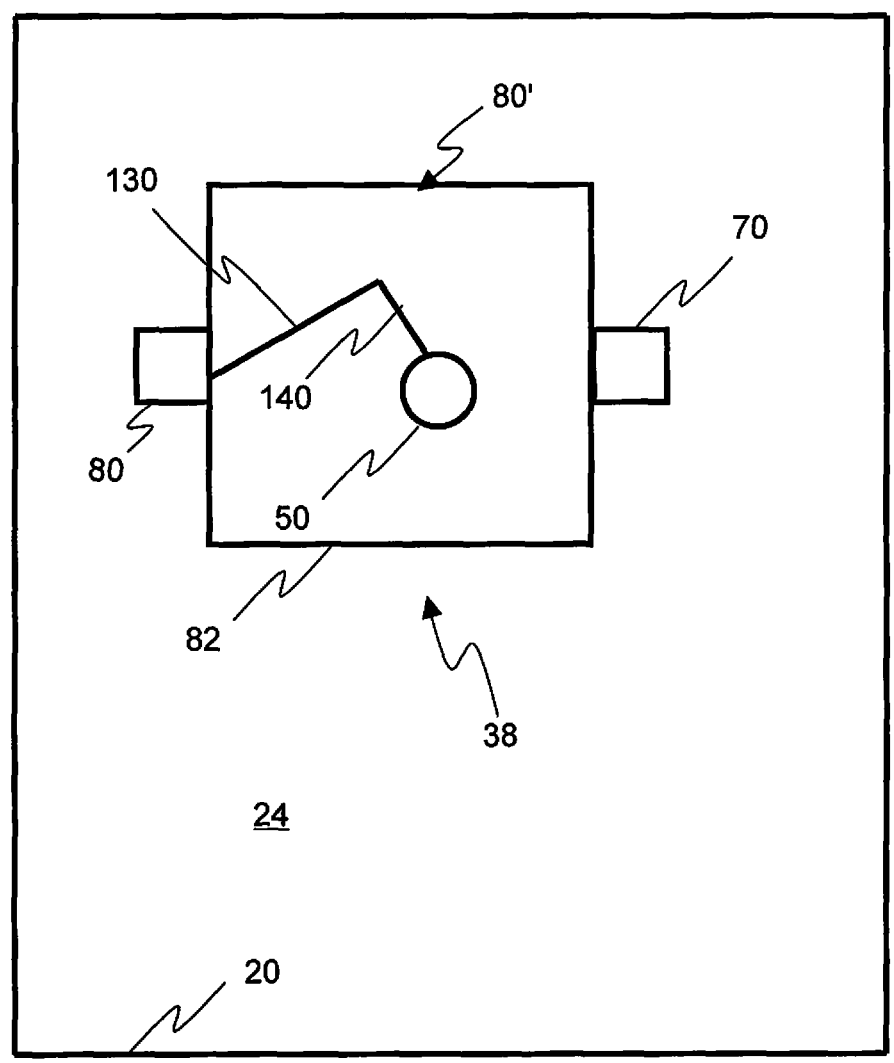

FIG. 4 schematically illustrates still further embodiments of a data input device affixed to a touch-sensitive user interface.

Figure 5A:
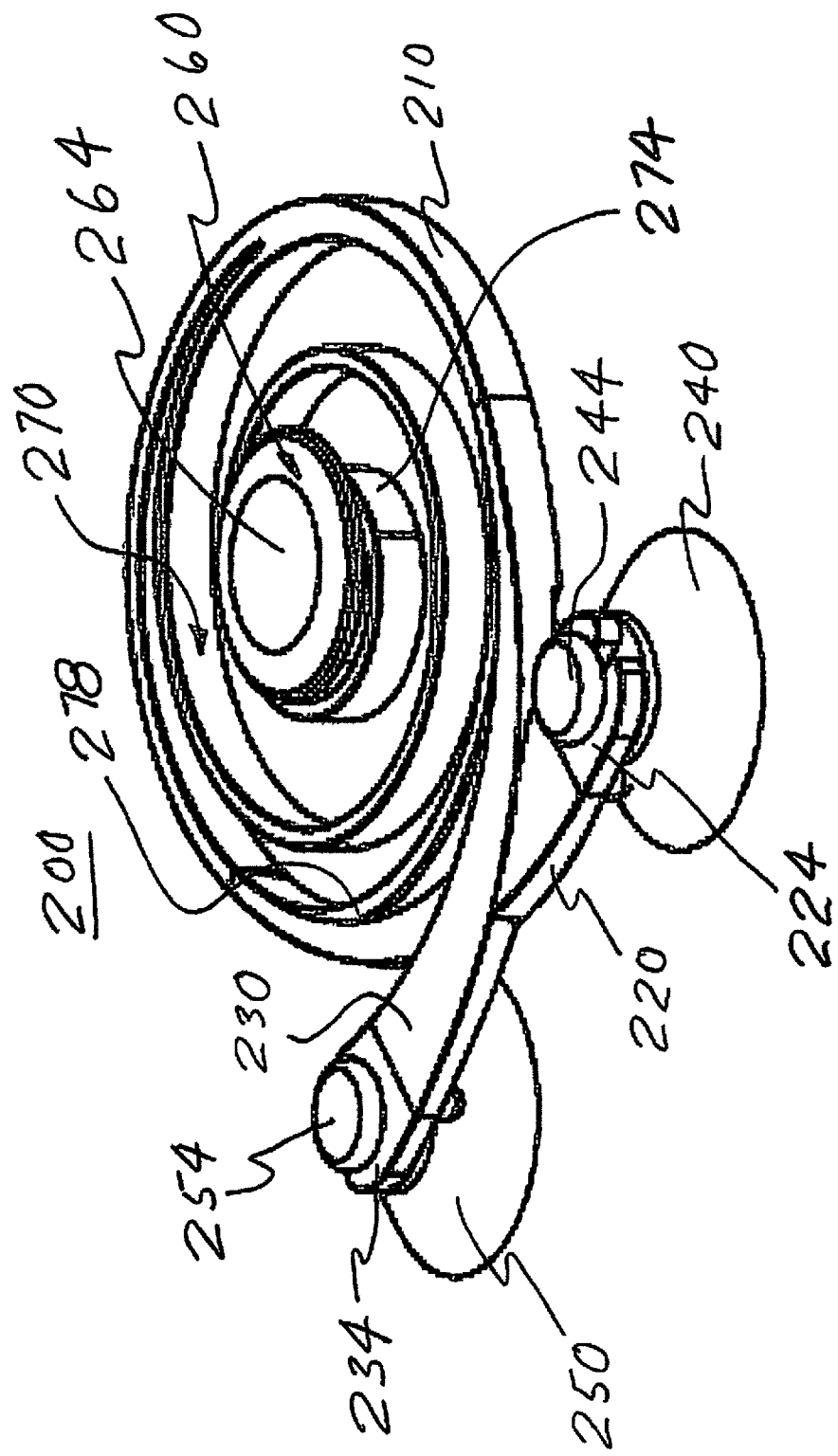

FIG. 5A is a perspective view from above of a data input device for use in inputting data to a touch-sensitive user interface.

Figure 5B:
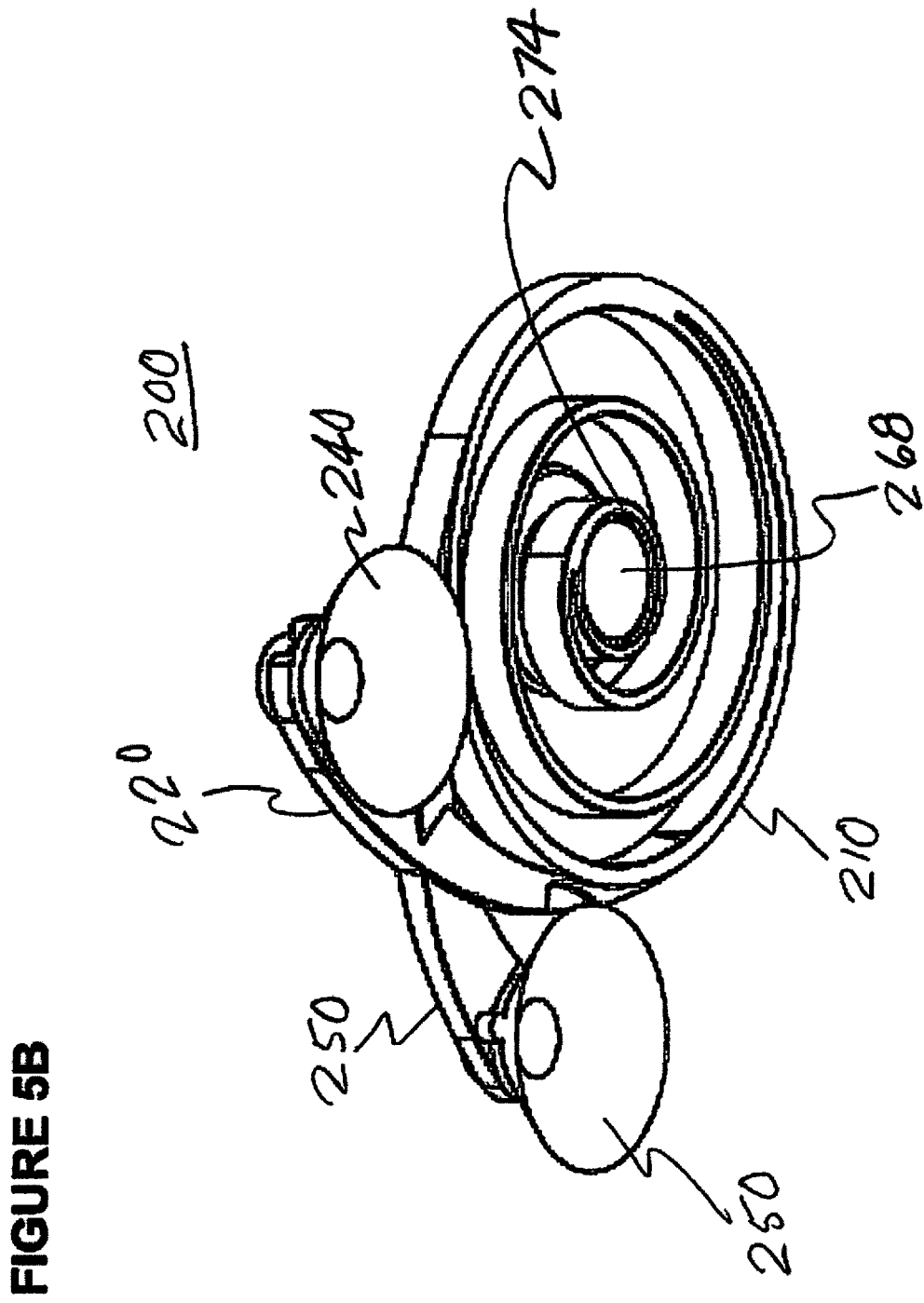

FIG. 5B is a perspective view from below of the data input device of FIG. 5A.

DETAILED DESCRIPTION OF CERTAIN PREFERRED EMBODIMENTS

A central feature of the invention is the incorporation of a movable button which when force is applied thereto comes into electrical contact with a touch-sensitive location on an electrically sensitive user interface surface. The advantageous mounting structure for the button—a member, especially a segmented arm—affords the desired range of motion. Effecting contact via a button provides the necessary user feedback concerning achievement of such contact. Moreover, in this manner, the button can readily be translated across the surface in "real time" during use. This means that not only is the button accurately positionable over a single touch-sensitive location, it further can be positioned over each of a plurality of them in sequence, one at a time, without unintended touching of another location on the surface.

The invention is useful with the general category of data processing devices comprising an electrically sensitive user interface surface, for instance, a touchscreen (such as a computer, mobile telephone, hand-held data processing device, or the like). The button serves as a touch-sensitive data input implement that responds, directly or indirectly, to a user's touch to input data to the data processing device. Various kinds of touch-sensitive data input devices respond to electrical, magnetic or pressure stimuli to sense a data input. For example, the Apple iPad™ device responds to a capacitive coupling of input circuitry embedded in its touchscreen to a user's body that results when the user touches the screen.

The data input implement of the invention generally comprising a button with a first surface that is engaged, for instance, pushed (directly or indirectly) by the user, and another surface which consequently comes into contact with the companion user interface (the button's "interface contact surface"). The button affords a user the desired feedback indicating the effectiveness of data input actions (such as from the act of pushing the button). The particular configuration of the button is not critical, as long as it has a portion which is engageable by the user and a portion which reacts to such engagement by functioning as the interface contact surface. The data input implement further includes a base which is secured, preferably temporarily, to the user interface via a suction cup, adhesive, a clamp or other fastening element. The implement's button component can comprise a conductive or semiconductive material in various embodiments of the invention. In such manner, the data input implement can interact electrically with the interface.

In good embodiments of the invention, the invention involves the capacitance-based inputting of data. More specifically, in these embodiments the electrical coupling between the data input implement and the data processing device is capacitive. The user interface of the data processing device is capable of sensing the presence of a capacitively-coupled load, ground or signal source. Accordingly, for instance, when the button's interface contact surface is pressed against the user interface surface the button becomes a plate of and thereby forms a capacitor. As will be understood by those skilled in the art, a typical electrically-sensitive user interface, such as a digitizing tablet, is a unit comprising an upper non-conductive surface on the one hand, and an underlying conductive layer or input circuiting embedded in the otherwise non-conductive surface on the other hand, which can act as the capacitor's opposite plate. The data processing device can sense the condition, or a change in the condition, of the thus-formed capacitor in order to effect data input. It goes almost without saying that the embodiments discussed above are not the only capacitive technology to which the invention can be applied. Other types of capacitance-based developments can also be brought into conformity with the invention. This includes a development in which the user interface incorporates a capacitor and the button is brought into electrical contact therewith whereby the capacitor's stored charge can flow into and through the button to a ground such as the user's body and the change in stored charge can be detected (for instance, the development referenced in U.S. Pat. No. 4,707,845).

In accordance with the invention, the data input implement also comprises one or more elements connecting the aforementioned button to the implement's base. The element can be an arm connected to the base and the button. The element is advantageously made of flexible material and preferably of transparent material to that the user interface display can be seen therethrough. In good embodiments of the invention the arm is of arcuate shape. Preferably, the arm is segmented into at least two parts. As a consequence of the foregoing, a user can move the button so connected to the base laterally over the interface surface in different directions. In this way, the user is enable to input data via the surface (for instance, touchscreen) corresponding to the direction of the button's motion, for example, to enable the user to input data while playing a game indicating a direction and magnitude of motion of an object or avatar. In the alternative, the user is able to selectively move the button to place it over locations of the touchscreen where various different data may be input. Additionally, the design of the data input implement enables temporary removal of the button, and the element connecting it to the base, from the surface of the user interface with which they are intended to interact. This feature can be enhanced by segmenting of the element connecting the base and the button, and incorporation in such element of a rotatable coupling between adjacent segments. Subject to the features discussed above, the connecting element's specific configuration and constituent material are not crucial. Once in possession of the teachings herein, those of ordinary skill in the art will be able to determine empirically a suitable configuration and constituent formulation. This will not require innovation rising to the level of further invention, and rather will be a matter of routine experimentation.

Yet another optional and advantageous feature of the invention is the capacity for incorporation of a biasing mechanism so as to cause the interface contact surface of the data input device's button component to be pushed against the user interface surface. This biasing can be achieved by angling an arm or arm segment of the connector element so that the button's interface contact surface is maintained in contact with the user interface surface, or by shaping the arm or arm segment so that such contact is maintained. Due to this feature, capacitive coupling between the button and the user interface is achieved and maintained. As the button is moved across the interface surface it inherits the latter's touch-sensitive traits. Moreover, as a consequence of that phenomenon, the user interface is activated when the button is engaged by a user, without movement of the button. Additional benefits from this configuration include the mitigation of noise from contact with the interface, of delay in actuating the button, and of pre-touch deviation from the center position of the range of motion.

Figure 1:
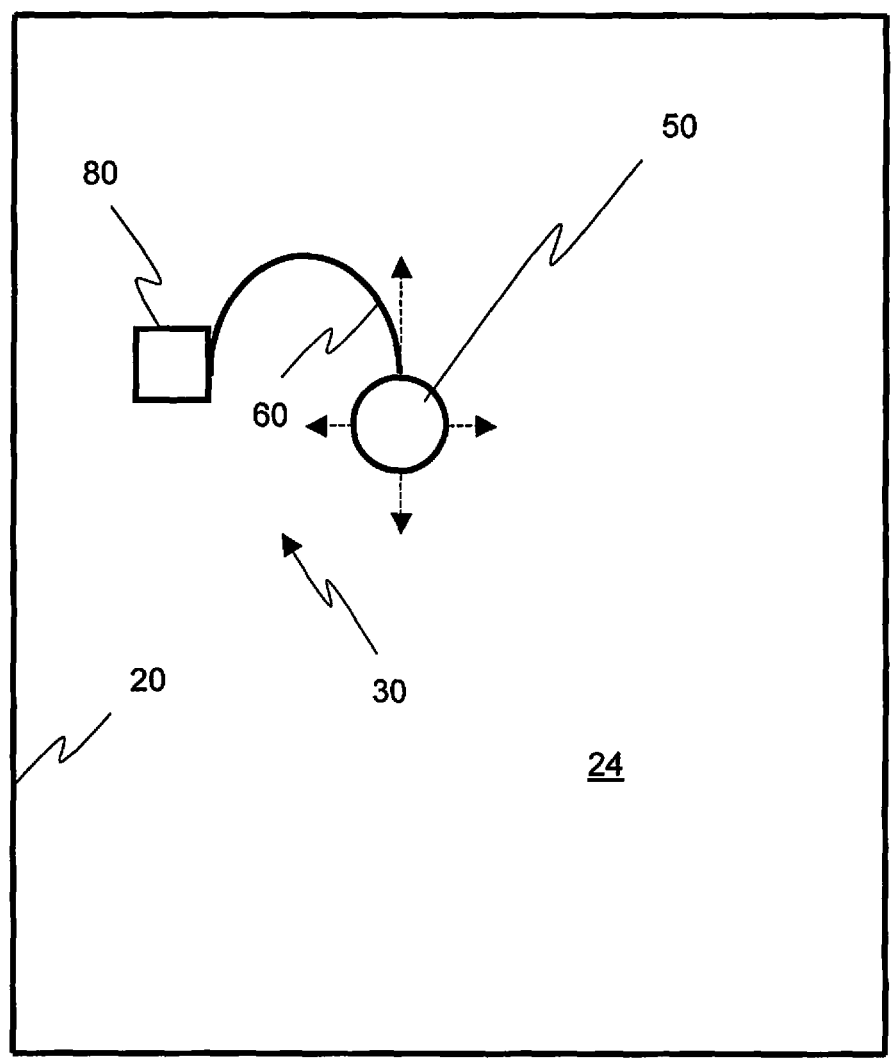
FIG. 1 is a schematic diagram illustrating a touch-sensitive user interface having a data input device affixed thereto.

Accordingly, with reference to FIG. 1, 20 indicates a lateral edge of a touchscreen which displays data through a surface 24 to a user of a data processing device (such as a computer, mobile telephone, hand-held data processing device, or the like). The touchscreen serves as a touch-sensitive data input unit that responds, directly or indirectly, to a user's touch to input data to the data processing device.

In the embodiments of FIG. 1, a base 80 of a touch-sensitive data input device 30 is affixed to the surface 24 of the touchscreen. In certain ones of such embodiments, the base 80 comprises a suction cup enabling the device 30 to be affixed temporarily to the surface 24. In other such embodiments, the base comprises a surface having an adhesive substance which serves to affix the base to the surface 24, while in still others, the base comprises a clamp that affixes to a frame of the touchscreen (not shown for purposes of simplicity and clarity).

The device 30 further comprises a button 50 having an upper surface that may be engaged by a user's finger and a lower surface (not shown for purposes of simplicity and clarity) that contacts the surface 24. In certain embodiments, the device 30 serves to capacitively couple the user's body (through the user's finger) to input circuitry embedded in the touchscreen. In such embodiments, the button 50 comprises an electrically conductive or semiconductive material providing electrical coupling between the button's lower surface in contact with the surface 24 and the upper surface of the button 50 in contact with the user's finger. In certain applications, the skin of the user's finger is placed in direct contact with the upper surface of the button 50. In certain other applications, the user's finger does not contact the upper surface of the button 50 directly, but rather through an intermediary object, such as a glove. If the intermediary object is non-conductive, it acts as a dielectric to capacitively couple the user's finger to the button. If the intermediary object is conductive or semiconductive, it acts as a conductive or semiconductive connection of the user's finger to the button.

An arm 60 having an arcuate shape is connected at a first end to the base 80 and at a second end to the button 50. The arm 60 comprises a flexible material, such as plastic or metal, which permits the user to move the button 50 laterally with respect to the base 80 within a limited range. This capability enables the user to move the button over the surface 24 of the touchscreen in any lateral direction as indicated by the dashed arrows in FIG. 1 extending from the button 60. In this way, the user is enabled to input data via the touchscreen corresponding to the direction of the button's motion, for example, to enable the user to input data while playing a game indicating a direction and magnitude of motion of an object or avatar. In the alternative, the user is able to selectively move the button 60 to place it over locations of the touchscreen where various different data may be input.

Figure 1A:
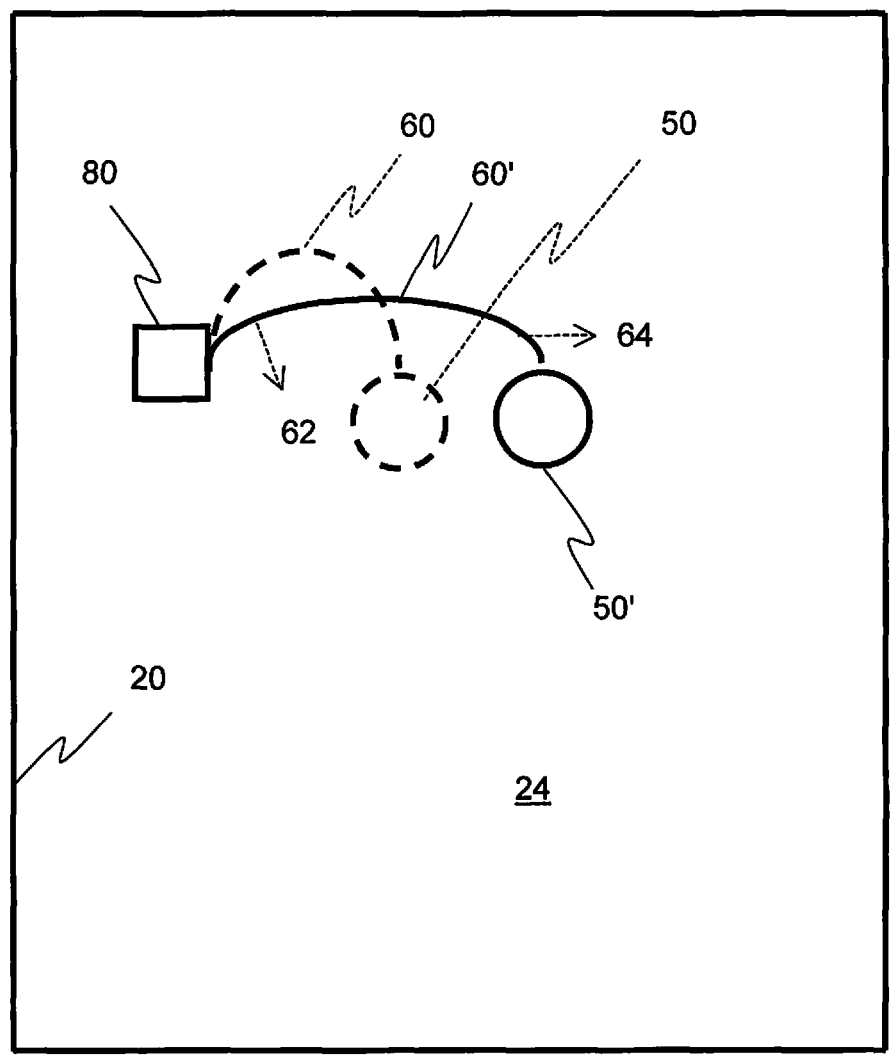
FIG. 1A is a schematic diagram illustrating the use of the data input device of FIG. 1 to input data to a data processing system via the touch-sensitive user interface.

FIG. 1A schematically illustrates how the arm 60 enables the button 50 to be moved over the surface 24 by the user. An initial, rest position of the button 50 and arm 60 is illustrated in dashed lines in FIG. 1A. The button 50 is illustrated in solid lines at a displaced position 50' to which it has been moved by a lateral force exerted by the user's finger through the upper surface of the button 50. In reaction to the force, the arm 60 is deformed as illustrated at 60'. As indicated by the arrow 62, a first arcuate segment of the arm 60 adjacent the base 80 has been moved downwardly and slightly to the right as illustrated in FIG. 1A. At the same time, a second arcuate segment of the arm 60 adjacent the button 50 has been moved to the right in FIG. 1A, as shown by the arrow 64, without also being moved in a downward direction. Accordingly, the first and second segments of arm 60 in this illustration have been moved in respectively different directions over the surface 24 in response to force applied by the user's finger to the button 50 to enable the button to move over the surface 24 of the touchscreen. It will also be appreciated that the structure of the arm 60 both limits the range of motion of the button 50 with respect to the base 80, and provides the user with a reactive force feedback which informs the user of an extent and direction that the user has displaced the button 50 from its rest position relative to the base 80 (indicated by the dashed line depiction of button 50 in FIG. 1A).

Figure 2:
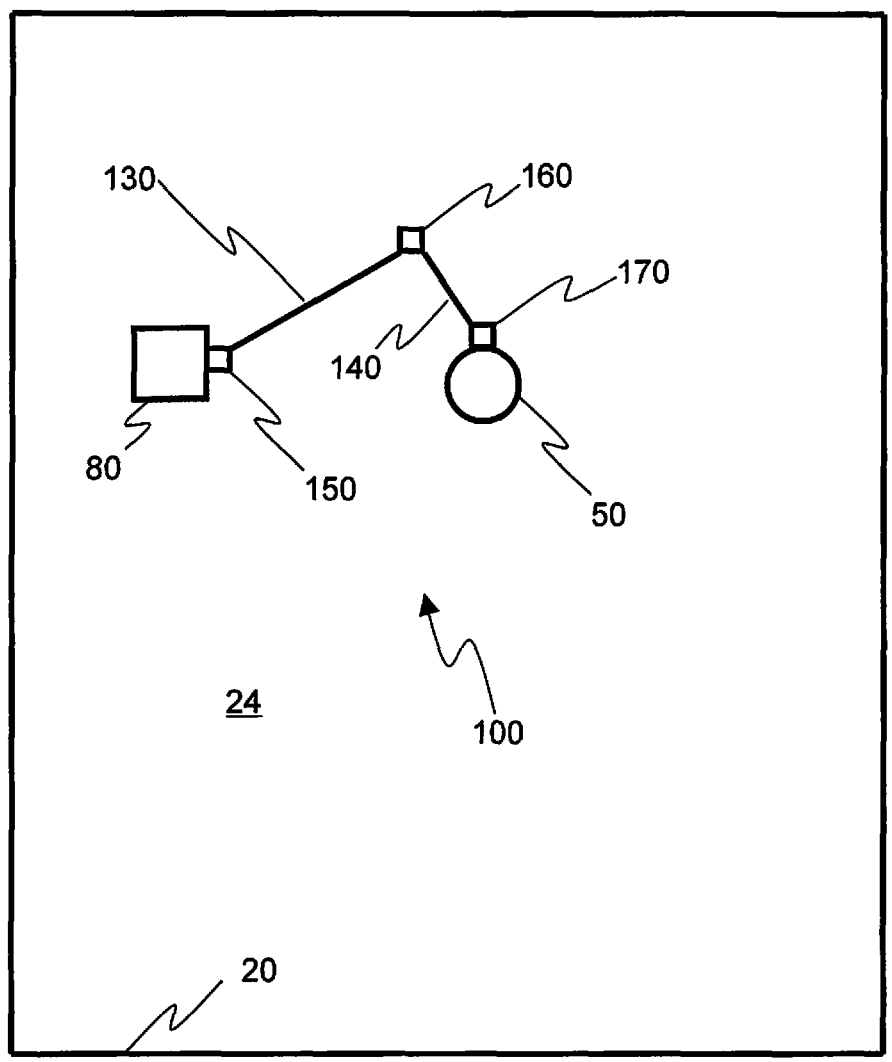
FIG. 2 is a schematic diagram illustrating other embodiments of a data input device affixed to a touch-sensitive user interface.

FIG. 2 schematically illustrates other embodiments of a touch-sensitive input device 100 affixed to the surface 24 of the touchscreen of FIG. 1. Elements of the device 100 corresponding to those of FIG. 1 are indicated by the same reference numerals in FIG. 2. In the input device 100 of FIG. 2, the button 50 is connected to the base 80 via an arm comprising a first arm segment 130 and a second arm segment 140 coupled with each other by a rotatable coupling 160. In certain ones of such embodiments, one or both of the arms segments 130 and 140 are linearly shaped, while in others one or both of segments 130 and 140 have a curved shape. In certain ones of such embodiments, the rotatable coupling 160 comprises a rotatable joint or bearing, while in others it comprises a flexible coupling comprising a deformable material.

In the embodiments of FIG. 2, base 80 is connected to the first arm segment 130 by a further rotatable coupling 150, and button 50 is connected to the second arm segment 140 by still another rotatable coupling 170. In certain ones of such embodiments, one or both of the rotatable coupling 150 and 170 comprise either a rotatable joint or bearing, or a flexible coupling comprising a deformable material. Thus, the combination of arm segments 130 and 140, together with rotatable couplings 160 and 150, permits the button 50 to be moved in multiple directions laterally over the surface 24 of the touchscreen in response to force applied thereto by the user's finger, while the rotatable coupling 170 permits the arm segment 140 to rotate with respect to the button 50 as it is thus moved. In this manner, the button 50 is able to maintain its angular disposition with respect to the user's finger to avoid inducing rotational stresses into the user's finger which can be distracting and can cause the user to lose contact with the button.

FIG. 3 schematically illustrates further embodiments of a touch-sensitive input device 34 affixed to the surface 24 of the touchscreen of FIG. 1. Elements of the device 34 corresponding to those of FIG. 1 are indicated by the same reference numerals in FIG. 3. While the embodiments of FIG. 3 employ the button 50 and the arm 60 of the FIG. 1 embodiments, the base 80 is replaced in the FIG. 3 embodiments by a base 80' comprising a rectangular frame 82 and first and second affixing devices 84 and 88 attached to opposite sides of the frame 82. Affixing devices 84 and 88 serve to affix the frame 82 to the surface 24 of the touchscreen, and in certain ones of such embodiments comprise suction cups or a downwardly-facing surface having an adhesive substance, for affixing to the surface 24, or else respective clamps for affixing to a frame of the touchscreen (not shown for purposes of simplicity and clarity).

An end of the arm 60 opposite the end thereof affixed to the button 50, is affixed to the frame 82. It will be appreciated that the frame 82 serves to limit the range of motion of the button 50, as well as to interconnect the two affixing devices 84 and 88. It will also be appreciated that the use of two affixing devices affixed to the surface 24 at spaced-apart locations provides a relatively more secure attachment of the touch-sensitive input device 34 to the surface 24.

FIG. 4 schematically illustrates still further embodiments of a touch-sensitive input device 38 affixed to the surface 24 of the touchscreen of FIG. 1. Elements of the device 38 corresponding to those of FIG. 1 are indicated by the same reference numerals in FIG. 4. The embodiments of FIG. 4 differ from those of FIG. 3 by substituting the arms 130 and 140 for the arm 60. In certain ones of the embodiments of FIG. 4, the arms 130 and 140 are made of a flexible material (such as plastic or metal) that enables arms 130 and 140 to flex as the button 50 is moved with respect to the frame 80'. In others of such embodiments, arms 130 and 140 are interconnected to each other and/or to frame 80' and/or to button 50 by rotatable couplings such as rotatable couplings 150, 160 and 170 of the FIG. 2 embodiments.

FIG. 5A is a perspective view from above of a data input device 200 for use in inputting data to a user interface arranged to input data in response to capacitive coupling of a user's finger through a surface of the interface, while FIG. 5B provides a perspective view of the device 200 from below. The device 200 comprises a generally circular frame 210 having first and second frame projections 220 and 230 extending in generally opposite directions from a side of frame 210, suction cups 240 and 250, a button 260 and a generally spiral-shaped arm 270 affixed at one end thereof to an inner surface of the frame 210 and extending through a curve having a continuously decreasing diameter to a seat 274 located centrally of the frame 210 through which the button 260 extends and which retains the button 260.

Each of the frame projections 220 and 230 is terminated by a clip 224 and 225 which receives and retains a stem 244 and 254 of a respective one of the suction cups 240 and 250. In certain embodiments of the data input device 200, the frame 210, frame projections 220 and 230 and arm 270 are formed integrally of injection-molded plastic, while suction cups 240 and 250 are made of a material that is relatively less stiff than the plastic of frame 210.

Button 260 has an upper surface 264 that is slightly concave to conform to the tip of a user's finger, and a lower surface 268 that is generally flat to conform to the surface of the user interface. Button 260 is made of a conductive or semiconductive material, such as metal. If metal, in certain embodiments button 260 is anodized to preserve its finish. Also, in certain embodiments a non-conductive single-sided tape is applied to the surface 268 to protect the surface of the user interface from damage by the button 260. In such embodiments, the area of surface 268 is made sufficiently large to ensure that adequate capacitive coupling is achieved between the button and input circuitry embedded in the user interface.

In certain embodiments of the data input device 200, the arm 270 is angled slightly downwardly with respect to the frame 210 so that, when the suction cups 240 and 250 are affixed to the surface of the user interface, the bottom surface 268 of button 260 is pressed against the surface of the user interface by the arm 270 as it is deflected upwardly. This feature biases the bottom surface 268 of the button 260 against the surface of the interface, which helps maintain the capacitive coupling of the button with the interface as the button and/or user interface is moved. This provides several advantages in operation. By keeping the button 260 pressed against the surface of the interface, the button inherits its touch-sensitive traits. Accordingly, when the user touches the button, the user interface is immediately activated without any travel by the button. Also, since the button remains in contact with the surface of the interface, it does not make noise due to impact with the surface. In certain embodiments, rather than angling the arm 270 with respect to the frame 210 in order to bias the bottom surface 268 of the button 260 against the surface of the interface, the arm 270 is shaped to achieve such bias.

Although various embodiments have been described with reference to a particular arrangement of parts, features and the like, these are not intended to exhaust all possible arrangements or features, and indeed many other embodiments, modifications and variations will be ascertainable to those of skill in the art.

What is claimed is:

1. A device for inputting data to a touch-sensitive user interface, consisting essentially of: a base operative to affix to the touch-sensitive user interface, said base including one or more fastening elements capable of affixing said base to the touch-sensitive user interface, said user interface both receiving data input through touching of the interface with a button connected to the base and responsively performing a particular function corresponding to the data input; the button having an outer touch surface and an inner surface operative to engage the user interface such that electrical contact is established between the button and the user interface, to convey a data input signal to the user interface in response to presence of a user's finger at the outer touch surface of the button; and an arm having a first end affixed to the base and a second end affixed to the button, the arm comprising first and second arm segments arranged between the first and second ends; each of the first and second arm segments being movable in respectively different directions over the user interface in response to force applied by the user's finger to the button to enable the button to move over the user interface.

2. The device of claim 1, wherein the arm comprises a curved member comprising the first and second arm segments.

3. The device of claim 2, wherein the curved member has a spiral shape.

4. The device of claim 2, wherein the first and second arm segments are comprised of a material permitting the first and second arm segments to be deformed in response to a force applied by the user's finger to the button, such that the user is enabled by applying such force to move the button in multiple directions over the user interface.

5. The device of claim 1, comprising a first rotatable connector joining the first arm segment to the base and a second rotatable connector joining the first arm segment to the second arm segment.

6. The device of claim 4, wherein each of the first and second arm segments has a linear shape.

7. The device of claim 4, wherein at least one of the first and second rotatable connectors comprises a bearing.

8. The device of claim 4, wherein at least one of the first and second rotatable connectors comprises a deformable material enabling the button to be rotated with respect to the arm.

9. The device of claim 1, comprising a rotatable connector affixing the button to the second end of the arm and permitting the arm to rotate with respect to the button as the user moves the button laterally over the user interface.

10. The device of claim 9, wherein the rotatable connector comprises a bearing.

11. The device of claim 9, wherein the rotatable connector comprises a deformable material enabling the button to be rotated with respect to the arm.

12. The device of claim 1, wherein the base comprises a first suction cup positioned with respect to the arm to affix to the user interface while the arm is enabled to move in a lateral direction over the user interface.

13. The device of claim 12, wherein the base further comprises a second suction cup spaced from the first suction cup and positioned with respect to the first suction cup to affix to the user interface while the first suction cup is affixed thereto.

14. The device of claim 1, comprising a frame limiting a range of motion of the button in a lateral direction over the user interface.

15. The device of claim 14, wherein the base comprises the frame.

16. The device of claim 15, wherein the base further comprises a first suction cup positioned with respect to the arm to affix to the user interface while the arm is enabled to move in the lateral direction over the user interface.

17. The device of claim 16, wherein the base still further comprises a second suction cup spaced from the first suction cup and positioned with respect to the first suction cup to affix to the user interface while the first suction cup is affixed thereto.

18. The device of claim 17, wherein the frame is affixed to the first and second suction cups and extends therebetween.

19. A device for inputting data to a touch-sensitive user interface, consisting essentially of: a base operative to affix to the touch-sensitive user interface, said base including one or more fastening elements capable of affixing said base to the touch-sensitive user interface, said user interface both receiving data input through touching of the interface with a button connected to the base and responsively performing a particular function corresponding to the data input; the button having an outer touch surface and an inner surface operative to engage the user interface such that electrical contact is established between the button and the user interface, to convey a data input signal to the user interface in response to presence of a user's finger at the outer touch surface of the button; a member affixed to the base; and a rotatable connector connecting the base-affixed member to the button, such that the member permits the button to be moved in multiple directions laterally over the user interface in response to force applied by the user's finger, while the rotatable connector permits the member to rotate with respect to the button as it is thus moved.

20. The device of claim 19, wherein the rotatable connector comprises a bearing.

21. The device of claim 19, wherein the rotatable connector comprises a deformable material enabling the button to be rotated with respect to the arm.

22. The device of claim 19, wherein the arm comprises a deformable material that applies a torque to the rotatable connector as the button is moved from a rest position with respect to the base, while applying a force against the button as a result of such movement, such that the user is thereupon provided with a force feedback via the button.

23. The device of claim 22, wherein the arm is curved.

24. The device of claim 23, wherein the arm has a spiral shape.

25. A device for inputting data to a touch-sensitive user interface, consisting essentially of: a base operative to affix to the touch-sensitive user interface, said base including one or more fastening elements capable of affixing said base to the touch-sensitive user interface, said user interface both receiving data input through touching of the interface with a button connected to the base and responsively performing a particular function corresponding to the data input; the button having an outer touch surface and an inner surface operative to engage the user interface such that electrical contact is established between the button and the user interface, to convey a data input signal to the user interface in response to presence of a user's finger at the outer touch surface of the button; and a member affixed to the base and to the button; the member biasing the inner surface of the button against separation from the user interface and permitting the button to move in multiple directions laterally over the user interface in response to force applied by the user's finger.

26. The device of claim 25, wherein the member is comprised of a resilient material disposed with respect to the base and the button such that affixing the base to the user interface deforms the resilient material resulting in a reactive force urging the button against the user interface.

27. A process for inputting data to a touch-sensitive user interface, consisting essentially of: affixing a base to the touch-sensitive user interface via one or more fastening elements capable of affixing said base to the touch-sensitive user interface, said user interface both receiving data input through touching of the interface with a button connected to the base and responsively performing a particular function corresponding to the data input, the base being affixed to a member, the member being affixed to the button; the button having an outer touch surface and an inner surface; engaging the user interface with the inner surface of the button such that electrical contact is established between the button and the user interface; conveying a data input signal to the user interface via the button in response to presence of a user's finger at the outer touch surface thereof; and biasing the inner surface of the button against the user interface by means of the member.

28. The process of claim 27, wherein the member is comprised of a resilient material, and biasing the inner surface of the button against the user interface comprises deforming the resilient material upon affixing the base to the user interface, resulting in a reactive force urging the button against the user interface.

29. A process for inputting data to a touch-sensitive user interface, consisting essentially of: affixing a base to the touch-sensitive user interface via one or more fastening elements capable of affixing said base to the touch-sensitive user interface, said user interface both receiving data input through touching of the interface with a button connected to the base and responsively performing a particular function corresponding to the data input, the base being affixed to an arm at a first of the arm's ends, and the arm being affixed to the button at a second of the arm's ends, said arm having first and second arm segments arranged between the first and second ends; the button having an outer touch surface and an inner surface; engaging the user interface with the inner surface of the button such that electrical contact is established between the button and the user interface; conveying a data input signal to the user interface via the button in response to presence of a user's finger at the outer touch surface thereof; and moving the button over the user interface in response to force applied by the user to the button such that the first and second arm segments move in respectively different directions laterally over the user interface to permit the button to move with respect to the base.

30. The process of claim 29, wherein moving the button over the user interface comprises deforming the first and second arm segments in response to the force applied by the user's finger to the button.

31. The process of claim 29, comprising rotating the button with respect to the arm as the button moves over the user interface.

32. The process of claim 29, comprising applying a force to the button as it is moved over the user interface tending to return the button to a predetermined rest position with respect to the base.

33. A process for inputting data to a touch-sensitive user interface, consisting essentially of: affixing a base to the touch-sensitive user interface via one or more fastening elements capable of affixing said base to the touch-sensitive user interface, said user interface both receiving data input through touching of the interface with a button connected to the base and responsively performing a particular function corresponding to the data input, the base being affixed to a member, the member being affixed to the button; the button having an outer touch surface and an inner surface; engaging the user interface with the inner surface of the button such that electrical contact is established between the button and the user interface; conveying a data input signal to the user interface via the button in response to presence of a user's finger at the outer touch surface thereof; and moving the button over the user interface in response to force applied by the user to the button while rotating the button with respect to the member.

34. The process of claim 33, wherein moving the button over the user interface comprises deforming the member in response to the force applied by the user to the button.

35. The process of claim 33, comprising applying a responsive force against the button in response to the movement thereof, such that the user is thereupon provided with a force feedback via the button.

36. The process of claim 33, comprising applying a responsive force against the button in response to the movement thereof, the responsive force tending to return the button to a predetermined rest position thereof with respect to the base.

37. The process of claim 33, wherein the member is connected to the button via a bearing and rotating the button comprises rotating the bearing.

38. The process of claim 33, wherein the member is connected to the button via a deformable coupling and rotating the button comprises deforming the deformable coupling.

* * * * *